United States Patent
Bhat et al.

(10) Patent No.: US 12,468,588 B1
(45) Date of Patent: Nov. 11, 2025

(54) NETWORK IMPROVEMENTS USING ADAPTIVE TIMING COMPENSATION TECHNIQUES

(71) Applicant: Amazon Technologies, Inc., Seattle, WA (US)

(72) Inventors: Uttam Bhat, Bangalore (IN); Bora Karaoglu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 445 days.

(21) Appl. No.: 18/077,708

(22) Filed: Dec. 8, 2022

(51) Int. Cl.
| | |
|---|---|
| H04W 28/06 | (2009.01) |
| G06F 11/07 | (2006.01) |
| G06F 11/30 | (2006.01) |
| H04W 24/02 | (2009.01) |
| H04W 52/02 | (2009.01) |

(52) U.S. Cl.
CPC ...... *G06F 11/0754* (2013.01); *G06F 11/3058* (2013.01); *H04W 24/02* (2013.01); *H04W 28/06* (2013.01); *H04W 52/0206* (2013.01)

(58) Field of Classification Search
CPC .......... G06F 11/0754; G06F 11/3058; H04W 24/02; H04W 28/06; H04W 52/0206
See application file for complete search history.

(56) References Cited

U.S. PATENT DOCUMENTS

| | | | | |
|---|---|---|---|---|
| 2013/0094413 A1* | 4/2013 | Turunen | ................ | H04W 76/28 370/311 |
| 2018/0365975 A1* | 12/2018 | Xu | ......... | G08B 29/185 |
| 2020/0260382 A1* | 8/2020 | Ljung | .................. | H04L 5/0048 |
| 2021/0014788 A1* | 1/2021 | Sahin | ............... | H04W 52/0219 |
| 2023/0284065 A1* | 9/2023 | Zhou | ..................... | H04W 24/10 370/252 |

* cited by examiner

*Primary Examiner* — David Bilodeau
(74) *Attorney, Agent, or Firm* — Eversheds Sutherland (US) LLP

(57) ABSTRACT

This disclosure describes techniques for managing clock drift compensation in a network of node devices. In some embodiments, such techniques may comprise determining a current status of a network that includes a set of node devices operating in a first mode, determining, based on the current status of the network, a quantity of the set of node devices to be switched to a second mode, determining, based on one or more characteristics of individual node devices in the set of node devices, a subset of the set of node devices including a selection of the quantity of node devices from the set of node devices, and providing, to individual node devices in the subset of the set of node devices, instructions to cause the individual node devices to switch from the first mode to the second mode.

37 Claims, 9 Drawing Sheets

NETWORK IMPROVEMENTS USING ADAPTIVE TIMING COMPENSATION TECHNIQUES

BACKGROUND

In a low-power wide area network (LPWAN), it is common for client devices in the network to reduce their energy consumption by regularly going into a sleep mode. In such devices, time synchronization might be used, in which transmission of packets to the device is synchronized based on a receive window. This enables the device to reduce power consumption outside of the receive window.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
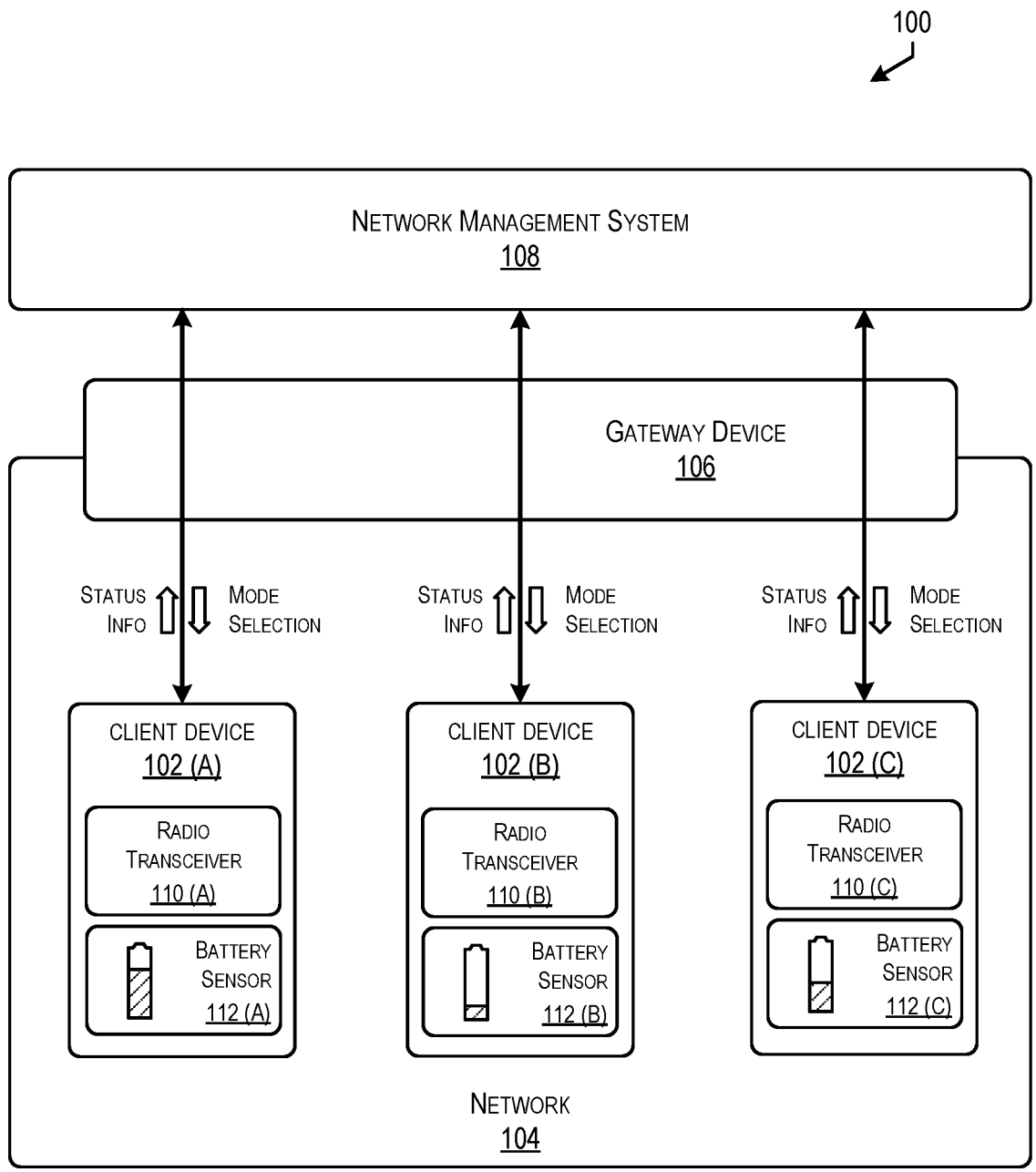
FIG. 1 depicts an example environment in which a system may be implemented to use adaptive timing compensation techniques in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

This disclosure describes, in part, techniques for managing communications between devices on a network. In embodiments, the techniques may be used by a network management system to adapt to various network conditions. Particularly, the techniques may be used to adjust or change a compensation mode on individual client devices within a network in order to optimize for network longevity or bandwidth usage.

During operation, a time synchronization mechanism may be used to time wake-up intervals during which a device is configured to receive information as well as to time the transmission of information to that device. This time synchronization mechanism may rely on local oscillator hardware that provides time reference for either the transmitter and/or the receiver devices, even in sleep mode. These oscillators may have certain drift due to various factors such as aging, temperature variation, capacitor load imbalance, etc. For the devices to be synchronized in the network during communications, those communications may need to compensate for timing errors, which can occur due to drift in the oscillators as noted above.

Suitable compensation for timing errors in communications can be made on the side of the transmitter via Transmit Side Compensation (TSC) techniques or on the side of the receiver via Receive Side Compensation (RSC) techniques.

For example, transmitter side compensation can be implemented by utilizing a preamble containing more preamble symbols, thus extending the amount of time over which the preamble may overlap with a receiving interval of the receiving device. The consequence of using such an approach is that the airtime needed for each transmission is increased, resulting in inefficient network usage. As the number of devices included in the network increases, these inefficiencies can add up and create bottlenecks.

In receiver side compensation techniques, the length of a receive window or receive interval can be increased in order to extend the amount of time over which the receive interval may overlap with a transmitted preamble. The consequences of using such an approach are that, given the increased duration of radio hardware operation, the amount of energy consumed by the receiving device might be increased substantially, resulting in a significant drain on the battery of that device.

Embodiments of the disclosure provide for techniques to compensate for clock drift in communications between devices by causing transitioning of those devices between TSC and RSC. Implementation of such techniques may result in optimizing battery life for one or more of those devices while reducing overall bandwidth usage for the network. In embodiments, the techniques may involve monitoring one or more metrics associated with the network in order to determine, at a given time, a current status of that network. Upon determining that the network status is unsatisfactory (e.g., a network score calculated based on the metrics has fallen below a threshold value), a network management system may identify a number of client devices on the network to be switched from TSC mode to RSC mode in order to reduce the strain on the network. Such client devices may be selected in a manner that lessens the impact on network longevity.

Embodiments of the disclosure provide for a number of advantages over conventional systems. In accordance with one or more preferred implementations, a utilized approach enables a network management system to reduce network congestion by switching a number of selected client devices from a first mode (e.g., TSC mode) to a second mode (e.g., RSC mode) while minimizing the effect that this may have on battery drain within the network. In other words, the techniques described herein, when implemented, can lower network congestion without significantly impacting the overall life of the client devices within that network.

FIG. 1 depicts an example environment in which a system may be implemented to use adaptive timing compensation techniques in accordance with at least some embodiments. An exemplary system as depicted with respect to environment 100 may include a number of client devices 102 (A-C) included in a network 104. The network 104 may further include at least one gateway device 106 that enables communication with one or more electronic devices outside of the network 104, such as a network management system 108.

A client device 102 may be any electronic device configured to communicate with other devices on the network 104. In some cases, the client device is a wireless sensor node equipped with one or more sensors, computing hardware, radio transceivers, and power components. The individual client devices in the network (e.g., a wireless sensor network (WSN)) may be inherently resource-constrained, in that they may have limited processing speed, storage capacity, and communication bandwidth. The client devices 102 may communicate among themselves or with the network management system 108 using radio signals.

Each of the client devices 102 (A-C) may include at least a respective radio transceiver 110 (A-C). The radio transceiver 110 may be configured to both transmit and receive communications between the respective client device 102 and another electronic device. In some cases, one or more of the client devices 102 (A-C) may further include a respective battery sensor 112 (A-C) that is configured to determine a current status of a battery (e.g., an amount of remaining charge) in the respective client device 102. In some cases, the client device 102 may be configured to transmit information obtained from its battery sensor to another electronic device (e.g., the network management system 108).

The network 104 may include any suitable local network of devices. In some embodiments, such a network 104 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. As noted above, the network 104 may include a wireless sensor network (WSN). In embodiments, the network 104 may be configured as a low-power (LP) version of a network type, such as a LPWAN. The devices in the network 104 might operate in either synchronous or asynchronous mode.

The gateway device 106 may include any electronic device that provides an ingress/egress point for a network (e.g., network 104). In embodiments, the gateway device 106 is a device that allows the management (control) of the network 104 and aggregates the information received from the client devices 102 to send real-time, or near real-time, data to a network management system. The gateway device 106 may act as a router for one or more client devices 102. An example of a gateway device 106 may include a router, routing switch, integrated access device, multiplexer, or any other suitable device. The gateway device 106 may include one or more processors and a memory that stores computer executable instructions for implementing at least a portion of the functionality described herein.

The network management system 108 may be any suitable computing device configured to manage communications between the client devices 102 using timing compensation techniques as described herein. In some embodiments, the network management system 108 may receive status information from one or more of the client devices 102. In some cases, such status information may include an indication of a current battery life for the respective client device. In some cases, such status information may include an indication of a timing intervals (e.g., for a check event), time lengths, or current drift to be associated with a particular client device 102 included in the network 104. Based on such information, and/or based on information about the network 104, the network management system 108 may be further configured to provide information about a mode selection to each of the client devices 102. This is described in greater detail below.

In embodiments in which the network management system uses a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
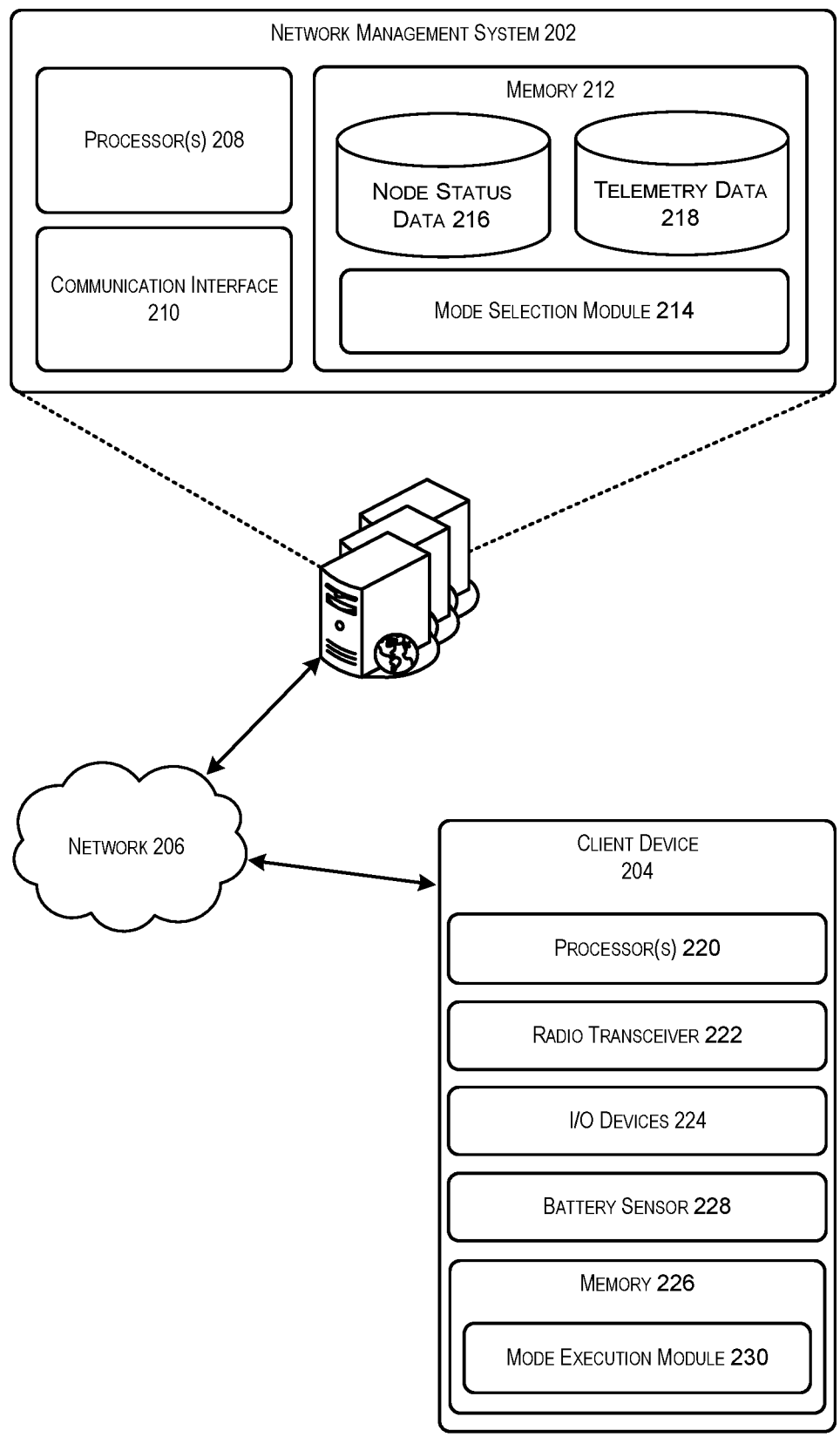
FIG. 2 depicts a system architecture that may be implemented to use adaptive timing compensation techniques in accordance with at least some embodiments.

FIG. 2 depicts a system architecture that may be implemented to use adaptive timing compensation techniques in accordance with at least some embodiments. As shown in FIG. 2, a network management system 202 may be in communication with at least one client device 204 via a network 206. The network management system 202, client device 204, and network 206 may be examples of the respective network management system 108, client device 102, and network 104 as described in relation to FIG. 1 above.

As noted above, the network management system may include any computing device configured to manage communications between the client devices 102 using timing compensation techniques as described herein. As depicted, the network management system 202 may include a number of hardware components, such as one or more processors 208, a communication interface 210, and a memory 212.

As used herein, a processor 208 may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The communication interface 210 may be any component configured to enable data to be communicated between electronic devices. The communication interface 210 may include one or more network interface controllers (NICs) or other types of transceiver devices to send and receive messages over network(s). For instance, the communication interface 210 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (Wi-Fi), or any other PAN message protocol. Furthermore, the communication interface 210 may include a wide area network (WAN) component to enable message over a wide area network.

Memory 212 may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information, and which can be accessed by the processor(s) 208.

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the communication interface 210, the I/O devices of the respective apparatuses, and so forth, and provide various services to applications or components executing on the processor(s) 208. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (ENEA OSE) as promulgated by ENEA AB of Sweden; and so forth.

Turning to the contents of the memory 212 in more detail, the memory 212 may include an operating system and one or more application programs or services for implementing the features disclosed herein including at least a module for determining an appropriate mode to be executed on each of a number of client devices 204 (mode selection module 214). Additionally, the memory may also include node status data 216 that includes an indication of a current status for each of a number of client devices as well as telemetry data 218 that includes information about the operation of at least one network (e.g., network 206) on which the client devices are included.

In embodiments, the mode selection module 214 may be configured to, in conjunction with the processors 208, determine a selection of a mode (e.g., TSC mode or RSC mode) to be implemented by individual client devices on the network 206. In some embodiments, the mode selection module 214 may be configured to monitor a status of the network 206. As long as the status of the network indicates that the network is performing at a predetermined threshold level, the mode selection module 214 may determine that all of the client devices 204 are to be placed in a TSC mode of operation. However, when the status of the network indicates that the network is performing below that first predetermined threshold level, the mode selection module 214 may determine that some portion of the client devices 204 connected to the network 206 are to be switched from the TSC mode of operation to an RSC mode of operation.

The current status of the network 206 may be determined based on telemetry data. For example, the remote server 202 may continue to collect and monitor network telemetry metric data (e.g., telemetry data 218) based on network traffic over the network 206. Exemplary network telemetry data may include any suitable information about the performance of the network. For example, the telemetry data may include information about key performance indicators (KPIs) such as network latency, jitter, loss, etc. In some cases, telemetry data for a network 206 may be collected using probes (e.g., HTTP HEAD requests or TCP pings). In embodiments, the mode selection module 214, during monitoring of the status of the network 206, may calculate the status as a numeric network score based on the collected telemetry metrics. The network score may then be compared on one or more threshold network score values to determine a mode of operation for one or more client devices 204.

Upon determining that the network score representing the current status of the network 206 has fallen below a threshold network score level, the mode selection module 214 may be configured to identify a number of client devices 204 on the network 206 to be switched from TSC mode to RSC mode and a period of time for doing so. This may involve determining the number of the client devices (e.g., how many) as well as which particular client devices should be switched. In some cases, the client devices 204 are switched from the TSC mode to an RSC mode in cycles or waves. For example, a first set of the total client devices on the network may be switched from a TSC mode to an RSC mode for a first period of time and a second set of client devices on the network may be switched from a TSC mode to an RSC mode during a second period of time. It should be noted that there may be some overlap between the first set of client devices and the second set of client devices.

The number of the client devices to be switched may be determined based on the current status of the network (e.g., as determined based on the network score). In some cases, the mode selection module 214 may be configured to take a tiered approach based on a number of threshold values. For example, if the network score is above a first threshold value, then a determination may be made to keep all of the client devices in TSC mode. If the network score is below the first threshold value, but above a second threshold value, then a determination may be made to switch a first portion of the client devices (e.g., a first percentage of the total client devices or a first predetermined number) from the current TSC mode to an RSC mode for a period of time. If the network score is below the second threshold value, but above a third threshold value, then a determination may be made to switch a second portion of the client devices (e.g., a second percentage of the total client devices or a second predetermined number) that is greater than the first portion from the current TSC mode to an RSC mode for a period of time. It should be noted that any number of "tiers" may be implemented using any suitable number of threshold values in this manner.

In some cases, the mode selection module 214 may be configured to switch a number of the client devices from a TSC mode to an RSC mode that is proportional to the network status as compared to an "optimal" network status. For example, the number of client devices to be switched may be calculated as:

$$N_S = N_T * (1.0 - (S_C/S_O))$$

In the above formula, $N_S$ represents the number of client devices to be switched at any given time from TSC mode to RSC mode, $N_T$ represents the total number of client devices connected to the network 206, Sc represents the current network score (e.g., some number out of 100), and $S_O$ represents an optimal network score (e.g., 100). Note that the above formula is simplified for the purposes of this example. One skilled in the art would recognize that other factors could be further used to make such a calculation.

Once the number of client devices to be switched from TSC mode to RSC mode has been determined, the mode selection module 214 may be configured to determine which client devices are to be switched and for how long. In some embodiments, such a selection may be made based on device-type characteristics (e.g., device specifications) of each of the client devices. In some embodiments, such a selection may be made based on one or more characteristics (e.g., a current battery status) of each of the client devices.

In embodiments in which the selection is made based on device-type characteristics of each of the client devices, the selection of client devices may be made with a goal of equalizing the increase in energy consumption for drift compensation across the client devices in the network. Particularly, client devices having low quality clocks typically need to compensate more aggressively. In other words, when such client devices enter RSC mode, they may require the use of a longer wake interval to account for their decreased clock accuracy. This means that such client devices may expend more energy in RSC mode than client devices having clocks with a higher accuracy. Accordingly, client devices with clocks that are less accurate may be selected less frequently or spend a smaller amount of time in RSC mode in order to limit the impact. On the other hand, client devices with clocks that are more accurate may be selected more frequently or spend a larger amount of time in RSC mode.

The network management system may maintain information about statistics and/or characteristics associated with each of a number of types of client devices. For example, information about particular client devices may be provided by a manufacturer or seller of the client device. Such information may include an indication of average or expected data values to be exhibited by such client devices. For example, the information may include average maximum clock drift characteristics for the client device, described in units of parts per million (PPM) that may be used to determine an accuracy of the clock included in a particular client device. In such cases, the information may include an indication of an average PPM offset related to a crystal oscillator included in the client device at room temperature. In some cases, an indication may be stored as to whether the device uses a TCXO compensation circuit to compensate for internal drift based on temperature variations.

In some cases, characteristic information may be provided by the client device itself. For example, when the client device 204 is provisioned onto the network 206, it may provide information about clock drift or other suitable characteristics. In another example, the client device 204 may provide synchronization signals on a periodic basis. The timing of such synchronization signals may be compared against expected timing to determine an accuracy of the clock in the client device.

In embodiments in which the selection is made based on a current status of each of the client devices, the selection of client devices may be made with a goal of lessening the impact of increased battery usage on client devices having less available battery, in order to extend the overall life of the network 206. In other words, such a selection method prioritizes the energy savings on devices with low remaining battery over the ones with high remaining battery. In some cases, the amount of the time each grouping of client devices (e.g., low battery life, high battery life) spends in the RSC mode is set proportional to the remaining battery life for that grouping of client devices.

The network management system may maintain information about a status of each client device (e.g., node status data 216). In some cases, the information about the status of each client device is updated as status information is received by the network management system from each of the client devices. For example, one or more client devices 204 may provide information about a current battery status. In this example, such information may include (but is not limited to) a state of charge (SOC), state of function (SOF), a state of health (SOF), and a variety of other values (e.g., temperature, etc.). Any suitable information about the current status of the client devices may be used by the mode selection module 214 to select a group of client devices to be switched into RSC mode.

As noted above, the client device 204 may be any electronic device configured to communicate with other devices on a network 206. As depicted, the client device 204 may include a number of hardware components, such as one or more processors 220, a radio transceiver 222, one or more input/output devices 224, and a memory 226. In some embodiments, the client device 204 further includes a battery sensor 228 configured to collect information about a current status of a battery or other power source installed within the client device 204.

Similar to that of the network management system 202, a processor 220 may include multiple processors and/or a processor having multiple cores. Likewise, memory 226 may include volatile and nonvolatile memory, removable and non-removable media implemented in any method or technology for storage of information.

A radio transceiver 222 may include any suitable combination of transmitter and receiver circuitry. In some embodiments, the radio transceiver 222 may be included in a network interface card included within the client device 204. In some cases, the radio transceiver may be external to the client device 204, in that it may be separate from the client device 204 but coupled to the client device 204 via a physical connection.

An input device of the I/O devices 224 may be any component configured to enable a user to provide input to the client device. Such an input device may include, but is not limited to, a button, a touch-sensitive surface, a switch, a slider, and/or any other type of device that allows a user to provide input to the client device 108.

An output device of the I/O devices 224 may be any component capable of providing an output signal to a user. In some cases, an output device may comprise one or more lights that are powered up to provide an output signal to a user. In some cases, an output device may be a speaker capable of producing sound in response to an electrical signal input.

The battery sensor 228 may include a suitable sensor device configured to collect metrics related to the current status of a power source of the client device 204, including a state of charge (SOC), state of function (SOF), an overall condition-age of battery (SOH State Of Health), and a variety of other values (e.g., temperature, etc.). The information collected by the battery sensor 228 may be provided (e.g., periodically) to the network management system 202 to be used to update the node status data 216 stored in relation to the respective client device 204.

Turning to the contents of the memory 226 in more detail, the memory 226 may include an operating system and one or more application programs or services for implementing the features disclosed herein including at least a module for causing a particular receiving and/or transmission protocol to be used by the client device 204.

In embodiments, the mode execution module 230 may be configured to, in conjunction with the processors 220, implement a mode selection as provided by the network management system 202. In embodiments, the client device 204 may operate in a default mode (e.g., TSC mode), and may be caused to operate in a second mode (e.g., RSC mode) for a specified amount of time before returning to the default mode. In such embodiments, the mode execution module 230 may receive instructions to change modes (e.g., to RSC mode) and a period of time over which the client device should remain in that mode. The mode execution module 230 may then switch from TSC mode to RSC mode for the indicated period of time. In some cases, the period of time may last mere seconds.

Figure 3:
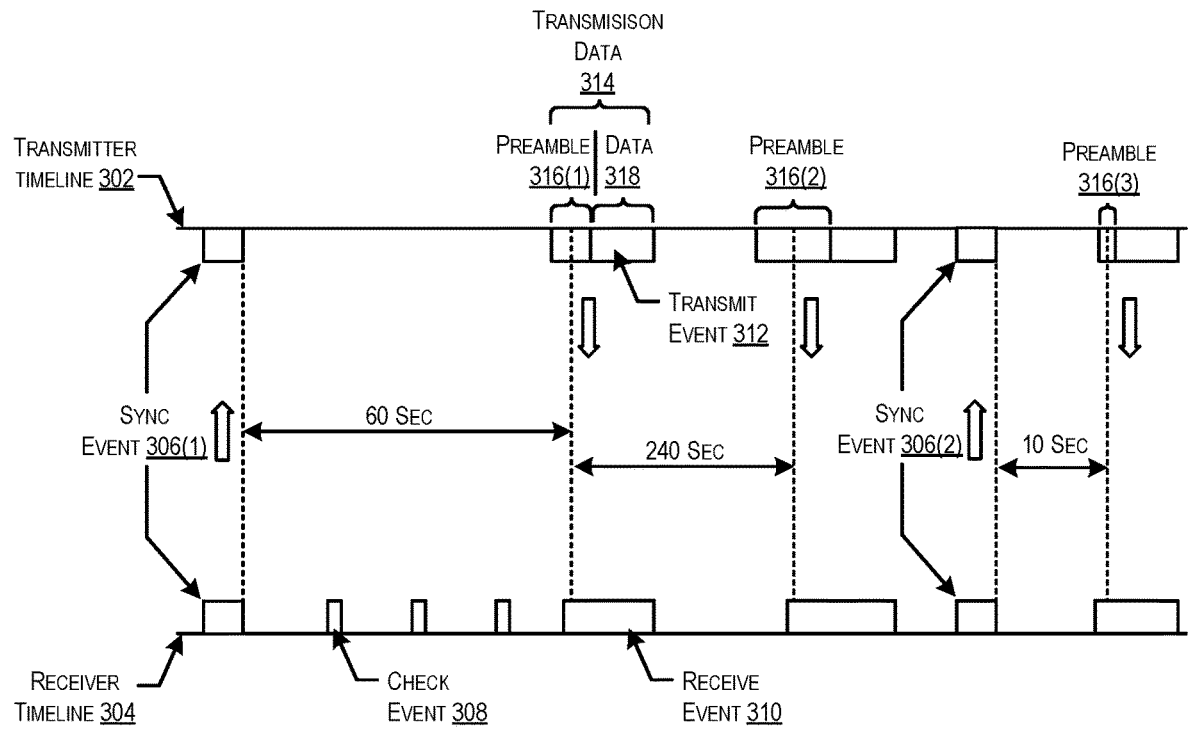
FIG. 3 depicts an illustration of techniques for performing transmit side compensation (TSC) to communicate with a client device in accordance with at least some embodiments.

FIG. 3 depicts an illustration of techniques for performing transmit side compensation to communicate with a client device in accordance with at least some embodiments.

Illustrated in FIG. 3 are a transmitter timeline 302 representing a first timeline associated with a transmitter device and a receiver timeline 304 representing a second timeline associated with a receiver device.

It should be noted that which device is the transmitter device and which device is the receiver device is context specific. For example, a device that is the receiver device in one scenario may be a transmitter device in another scenario. By way of illustration, the illustrated example may represent communications between a first and second of two client devices (e.g., client devices 102 of FIG. 1) in embodiments of the system. In this illustration, the roles of the first and second client devices may be reversed in a subsequent scenario, in that the transmitter device of the depicted example may be the receiver device in the subsequent scenario and vice versa.

As noted elsewhere, a receiver device may be configured to operate using a sleep-wake cycle in which the radio circuitry is powered on during wake intervals and powered off during sleep intervals (e.g., periods of time that are not wake intervals). In some cases, wake intervals may occur during events in which the receiver device is configured to communicate, or at least check for communications with, the transmitter device. Such events may include a synchronization event 306, a check event 308, and/or a receive event 310.

A synchronization event 306 may be any event in which the receiver device may transmit a synchronization signal to the transmitter device to cause the timing to be synchronized (e.g., matched up). As illustrated at 306 (1) and 306 (2) on the respective timelines, this may occur at predetermined intervals (e.g., every 5 minutes). Upon receiving the synchronization signal from the receiver device at 306, the transmitter device may cause its internal timing mechanism to be updated to match that of the receiver device. In some cases, the synchronization signal may include an indication of timing information (e.g., a predetermined amount of time and/or interval) for check events. In these cases, the transmitter device may be configured to adapt its own timing information to that indicated in the synchronization signal.

A check event 308 may be any event in which the receiver device is configured to wake up (e.g., power on its radio) in order to receive any communications transmitted by the transmitter. A check event 308 may be associated with a predetermined amount of time. In some cases, such a predetermined amount of time may be a default (or standard) amount of time. In other cases, such a predetermined amount of time may vary based on one or more configuration settings associated with the receiver device and/or a type of the receiver device. Additionally, a check event 308 may occur at predetermined intervals (e.g., every 15 seconds, etc.). Once more, the predetermined intervals at which the check events occur may be default (or standard) intervals or the predetermined intervals may vary based on one or more configuration settings associated with the receiver device and/or a type of the receiver device. A check event 308 either ends if no communications are received in the predetermined amount of time or becomes a receive event 310 if communications are received in the predetermined amount of time.

A receive event 310 may be any event in which data is communicated by the transmitter device to the receiver device during a transmission event 312. A receive event 310 may begin during a check event 308 upon beginning to receive transmission data 314 from the transmitter device. The transmission data 314 may include a preamble 316 and data 318. In some embodiments, data included in the preamble 316 is discarded by the receiver device and only the data 318 is processed.

As noted above, transmission data 314 may include a preamble 316 and data 318. The preamble 316 may be data used to extend the overall length of the transmit event 312 whereas the data 318 may be data intended to be consumed by the receiver device. In various transmit side compensation techniques, the length of the preamble 316 may vary based on timing. For example, the length of (e.g., number of symbols included in) the preamble may be increased as the time from the latest synchronization event 306 is increased. In this example, a preamble 316 (2) for a communication that occurs some amount of time (e.g., 300 seconds) after synchronization event 306 (1) may be longer than a preamble 316 (1) for a communication that occurs a shorter amount of time (e.g., 60 seconds) after synchronization event 306 (1). In this example, the length of the preamble 316 (2) may be 60 milliseconds whereas the length of the preamble 316 (1) may be 12 milliseconds. Additionally, the length of the preamble may be reset each time that a synchronization event 306 occurs. For example, a length of the preamble 316 (3) for a communication that occurs very closely after (e.g., 10 seconds) may have a length that is extremely short (e.g., 1 millisecond). In TSC techniques as depicted, the length of the preamble is used to offset any potential drift in timing that occurs after the synchronization event. Hence, the in such TSC techniques, the compensation is performed by the transmitter device.

As noted elsewhere, while TSC techniques can be used by a transmitter device to compensate for drifts in timing for communications, such techniques result in longer transmissions (as a result of the additional preamble data) than would otherwise be used. This, in turn, can increase bandwidth usage/congestion on a network. Accordingly, such TSC techniques, while effective, may be costly in terms of bandwidth.

Figure 4:
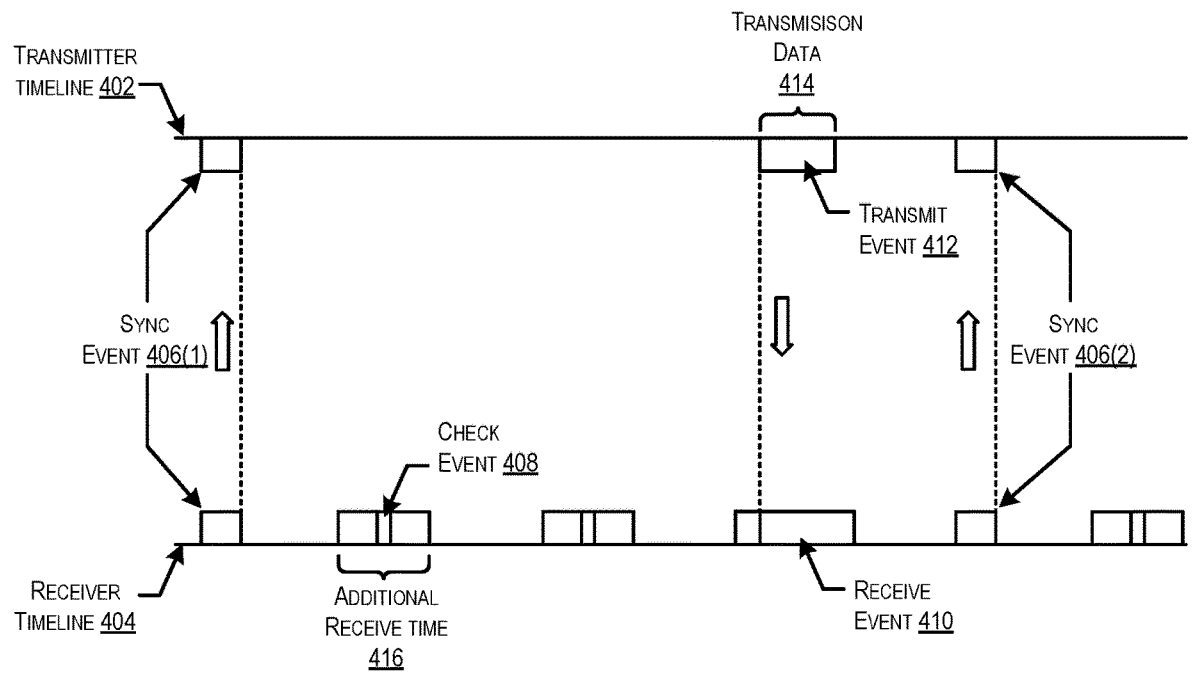
FIG. 4 depicts an illustration of techniques for communicating with a client device configured to use receive side compensation (RSC) techniques in accordance with at least some embodiments.

FIG. 4 depicts an illustration of techniques for communicating with a client device configured to use receive side compensation techniques in accordance with at least some embodiments. Illustrated in FIG. 4 are a transmitter timeline 402 representing a first timeline associated with a transmitter device and a receiver timeline 404 representing a second timeline associated with a receiver device.

Similar to the example illustrated in FIG. 3, a receiver device may be configured to operate using a sleep-wake cycle in which the radio circuitry is powered on during wake intervals and powered off during sleep intervals (e.g., periods of time that are not wake intervals). In some cases, wake intervals may occur during events in which the receiver device is configured to communicate, or at least check for communications with, the transmitter device. Such events may include a synchronization event 406, a check event 408, and/or a receive event 410.

As noted above, a synchronization event 406 may be any event in which the receiver device may transmit a synchronization signal to the transmitter device to cause the timing to be synchronized (e.g., matched up). As illustrated at 406 (1) and 406 (2) on the respective timelines, this may occur at predetermined intervals (e.g., every 5 minutes).

As also noted above, a check event 408 may be any event in which the receiver device is configured to wake up (e.g., power on its radio) in order to receive any communications transmitted by the transmitter. A check event 408 either ends if no communications are received in the predetermined amount of time or becomes a receive event 410 if communications are received in the predetermined amount of time.

As also noted above, a receive event 410 may be any event in which data is communicated by the transmitter device to the receiver device during a transmission event 412. A receive event 410 may begin during a check event 408 upon beginning to receive transmission data 414 from the transmitter device.

Similar to the TSC techniques described in FIG. 3 above, the transmitter device may initiate a transmit event 412 in which transmission data 414 is communicated to the receiver device as a receive event 410. However, in contrast to those techniques, in the RSC techniques the transmission data 414 may not include, or may include only a small, a preamble of data. Instead, compensation for drift in timing is performed by the receiver device by extending the time interval associated with the check event 408 to include additional receive time 416. More particularly, to compensate for drifts in timing, the time interval associated with the check event 408 can be extended in either one or both directions along the timeline. In some cases, the amount of additional time 416 that the time interval associated with the check event 408 is extended may be a predetermined (e.g., set) time interval. In some cases, the amount of additional time 416 that the time interval associated with the check event 408 is extended may vary based on the amount of time that has lapsed since the last synchronization event 406 (1 or 2). In this example, the amount of additional time 416 may increase as the amount of time that has lapsed since the last synchronization event increases and may reset to an initial, or default, amount of additional time each time that a synchronization event occurs.

As noted elsewhere, while RSC techniques can be used by a receiver device to compensate for drifts in timing for communications, such techniques result in the radio device being activated (e.g., powered up) for a substantially greater amount of time than it otherwise would be. Accordingly, such RSC techniques, while effective, may be costly in terms of power consumption/battery usage.

Figure 5:
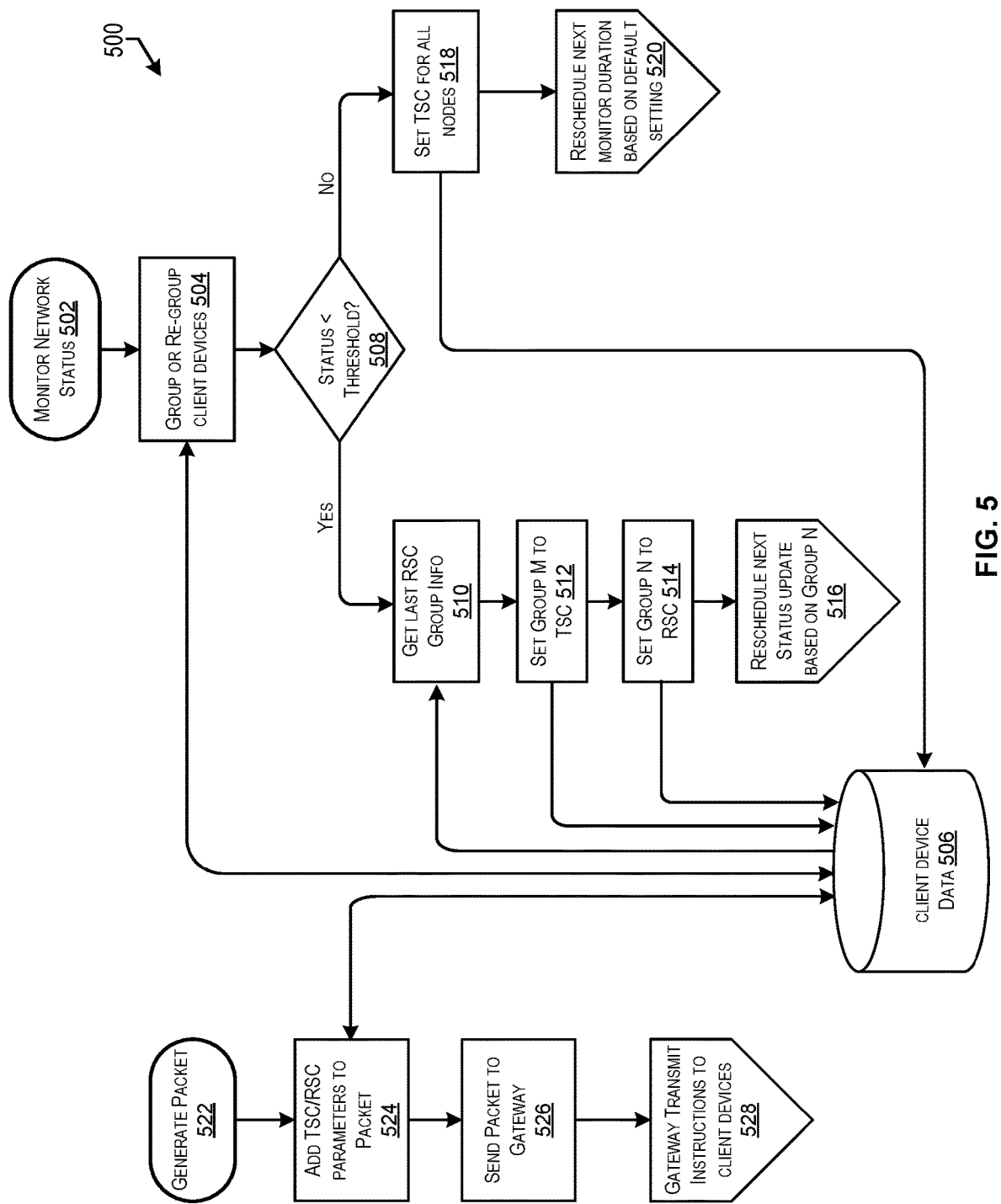
FIG. 5 depicts a flow chart illustrating an example process for monitoring a network status and selecting a number of client devices to switch modes based on the network status in accordance with at least some embodiments.

FIG. 5 depicts a flow chart illustrating an example process for monitoring a network status and selecting a number of client devices to switch modes based on the network status in accordance with at least some embodiments. While the process 500 is depicted as a series of blocks, it should be noted that the steps described in relation to process 500 may be performed in any suitable order. The process 500 may be performed by a network management system, such as the network management system 108 as described in relation to FIG. 1 above.

At 502 of the process 500, a network management system 108 may monitor the status of a network that includes a number of client devices. As noted above, in some cases, this may involve the use of network probes (e.g., HTTP HEAD requests or TCP pings). In embodiments, the current status of a network may be determined by a gateway device in communication with that network. A current network status may be determined based on metrics obtained in relation to that network. For example, a current network status may be determined based on KPI metrics collected from the network. In another example, a current network status may be determined based on information about a throughput of the network. In this example, each of a number of client devices may provide information (e.g., to a gateway device) about information packets received by that client device. The gateway device may maintain information about a number of information packets sent to each of the client devices. In this example, a throughput may be calculated as a ratio of the number of information packets received by the client devices to number of information packets sent to the client devices.

At 504 of the process 500, the network management system may group or re-group client devices. In some cases, the client devices may be grouped based on a geographic region in which they are located and/or a gateway device that they may be accessed through. Multiple gateway devices may act as ingress/egress points to provide access to the same network of client devices. In such cases, client devices may be grouped based on a particular gateway device used to communicate with that client device. For example, the client device may communicate with an external network via a gateway device that is located closest (e.g., geographically proximate) to that client device. In this example, information about the gateway device used to communicate with the client device may be used to group a number of client devices by gateway device. In some cases, the client device may be mobile, in that it is capable of moving or otherwise changing location. In these cases, the client device may be grouped based on the gateway device to which the client device was last in communication.

In some embodiments, client devices may be grouped or re-grouped based on characteristics of those client devices. For example, client devices may be grouped based on a determined accuracy of an internal clock included in that client device. In this example, client devices having accurate internal clocks may be put in a first group whereas client devices having inaccurate internal clocks may be put in a second group. In another example, client devices may be grouped based on a current SOC of a battery included in that client device. For example, client devices may be grouped based into groups corresponding to low SOC, mid SOC, and high SOC. In some cases, the client devices may be grouped according to a combination of factors. For example, a group of client devices may be identified as having an accurate internal clock and high SOC. An exemplary process for grouping client devices is described in greater detail with respect to FIG. 6 below.

Information about each client device may be stored in a database (or other suitable data structure) of client device data 506. In embodiments, information about each client device may be received by a gateway device in communication with that client device. For example, the gateway device may receive information about a battery status from one or more client device and may forward that information to the network management system. In another example, the gateway device may receive, at periodic intervals, a synchronization signal from one or more of the client devices with which it is in communication. In this example, the gateway device may determine, based on that information, an accuracy of an internal clock included in the client device and/or an amount of clock drift to be associated with the client device. In some embodiments, information about a client device may be received from a third-party entity (e.g., an entity unaffiliated with the network management system). For example, information about one or more client devices may be received from a manufacturer of the client device. Additionally, the client device data 506 may maintain information about one or more current groupings of those client devices.

At 508 of the process 500, a determination may be made as to whether a current status of the network is above or below a threshold status value. This may involve generating a network score as a numeric representation of the current status of the network based on metrics collected in relation to that network. The network score may then be compared to a predetermined threshold data value. Based on this comparison, a determination may be made as to whether one or more client devices are to be placed into RSC mode.

At 510, upon determining that one or more client devices are to be placed into RSC mode (e.g., "Yes" at decision block 508), the process 500 may involve retrieving information about the last group of client devices placed into RSC mode. Information about the last group of client devices placed into RSC mode may be stored in, and retrieved from, client device data 506.

At 512 of the process 500, and once information about the last group of client devices to be placed into RSC mode has been retrieved, the process may involve identifying a group of client devices M to be placed into (or remain within) TSC mode.

At 514 of the process 500, the process may further involve identifying a group of client devices N to be placed into RSC mode. In some cases, the group N may be identified based on one or more characteristics associated with the client devices included within that group. For example, the group N may be identified based on a battery SOC associated with the client devices in the group N. In another example, the group N may be identified based on a determined accuracy of an internal clock associated with the client devices in the group N.

In some cases, the network management system may define a schedule of groups of client devices to be rotated into, and out of, various compensation modes. For example, the network management system may generate a schedule that indicates a number of groups and corresponding time periods over which those groups are to be placed into a particular mode. In these cases, upon determining the last group of client devices to be placed into RSC mode at 510, the network management system may, at step 514, identify group N as the next group scheduled to enter RSC mode via the generated schedule.

At 516 of the process 500, the process may further involve scheduling the next status update (e.g., return to step 502) based on group N. In some embodiments, an amount of time after which the next status update is to be performed may be dependent upon a period of time over which the group N of client devices is to be placed into RSC mode. For example, the next status update may be performed at the time that, or shortly before, the group N of client devices is scheduled to exit RSC mode.

At 518, upon determining that no client devices are to be placed into RSC mode (e.g., "No" at decision block 508), the process 500 may involve causing all of the client devices in the network to be placed into TSC mode. This may involve providing instructions to the gateway device to be routed to each of the client devices in the network that are not already in TSC mode to be switched to TSC mode.

At 520 of the process 500, the process may further involve scheduling a next status update (e.g., return to step 502). In embodiments, the next status update is scheduled to occur at a default period of time (e.g., 2 minutes, etc.) after step 502 has been completed.

At 522, once a determination has been made of a group N of client devices to be placed into RSC mode, the process 500 may involve generating a packet of instructions to be sent to a gateway device at 522 to be routed to each of the client devices in group N.

At 524, the network management system identifies TSC/RSC parameters (e.g., mode selection information) determined for each of the client devices in the network that are to be switched modes to be added to the generated packet. The information may include an indication of which devices are to be switched to a different mode as well as a period of time for which those client devices are to be placed into the respective modes.

Once the packet has been generated to include the TSC/RSC parameters, the network management system sends the packet to the gateway device at 526. Upon receiving the packet, the gateway is caused, at 528, to transmit instructions to each of the client devices indicated in the packet to cause each of those client devices to switch to the respective modes. In embodiments, the gateway device may provide, to each client device, a selection of a mode and a time period over which that client device is to remain in that mode. Upon receiving those instructions, the client device is configured (e.g., via mode selection module 230) to switch to the selected mode.

Figure 6:
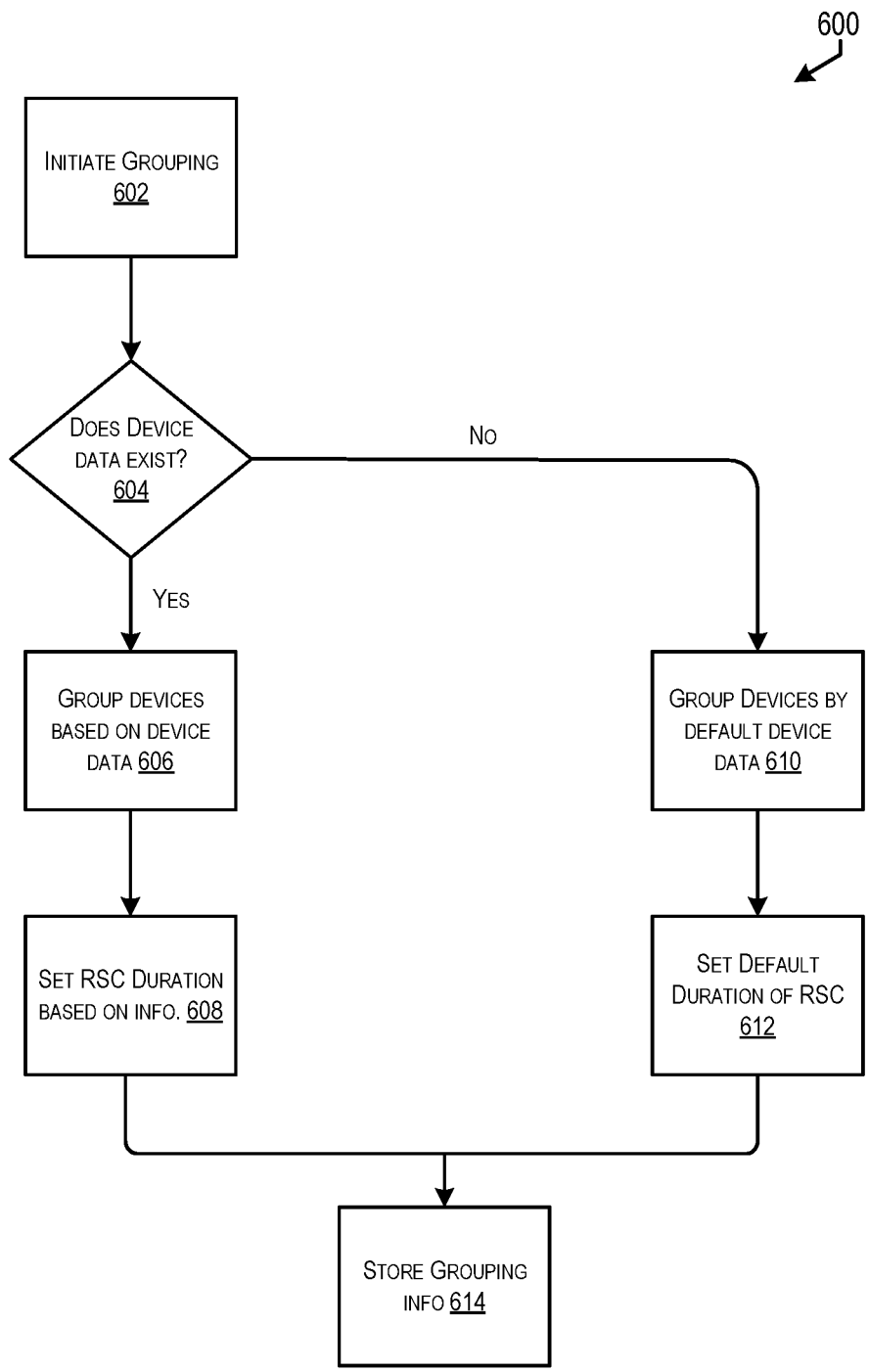
FIG. 6 depicts a flow chart illustrating an example process for selecting a number of client devices to switch modes based on device-specific characteristics in accordance with at least some embodiments.

FIG. 6 depicts a flow chart illustrating an example process for selecting a number of client devices to switch modes based on device-specific characteristics in accordance with at least some embodiments. More particularly, the process 600 is directed to generating groups of client devices to be switched into different modes upon detecting particular conditions.

At 602, the process may be initiated by a network management system in order to determine a number of client devices to be placed into particular compensation mode (e.g., RSC mode), conditions under which that group of client devices is to be placed in the mode, and a time period over which the group of client devices is to be placed in the mode. It should be noted that information about groupings of client devices may be determined prior to making a determination that a number of client devices are to be switched to a different mode (e.g., prior to step 502 of process 500). Information about groupings of client devices may be stored in memory and retrieved at a later time. Information about groupings of client devices may also be updated as new information is received. For example, a client device in a high SOC group of client devices may be removed from that group upon receiving an indication that the client device no longer has a high SOC.

At 604, a determination is made as to whether data to be used in grouping the client devices is maintained by the network management system. For example, a determination may be made as to whether the network management system maintains information about a clock drift or clock accuracy associated with the client devices. In another example, a determination may be made as to whether the network management system maintains information about battery conditions. In the above examples, such information may be provided by a third-party entity (e.g., a manufacturer of the client device) or it may be populated based on information obtained from the client devices via the gateway device.

At 606, upon determining that the data to be used in grouping the client devices is maintained by the network management system (e.g., "Yes" from decision block 604), the process 600 may involve grouping client devices based on that data. For example, the network management system may categorize each client device in a network based on characteristics of those client devices. Client devices in the network may be categorized based on a similarity in the characteristics of those client devices. For example, client devices having a similar determined clock drift time may be grouped. In this example, client devices having a clock drift that is greater than a first threshold may be grouped into a first group, client devices having a clock drift that is less than the first threshold and greater than a second threshold may be grouped into a second group, and client devices having a clock drift that is less than the second threshold may be grouped into a third group.

At 608, the process 600 may involve determining a period of time over which each of a group of client devices should be set to an RSC mode. In embodiments, the amount of time over which the client devices in a group should be placed into an RSC mode may be determined based on the characteristics of the client devices in the group. For example, client devices in a first group that includes client devices with a high SOC may be placed in an RSC mode for a longer duration of time than client devices in a second group that includes client devices with a medium SOC.

At 610, upon determining that the data to be used in grouping the client devices is not maintained by the network management system (e.g., "No" from decision block 604), the process 600 may involve grouping client devices based on default data. In such cases, the client devices may be grouped based on information about average characteristics as determined based on a type or model of the client devices. For example, the groupings may be made based on information provided by a manufacturer of the client devices.

At 612, the process 600 may involve assigning a default period of time to each of the groups. The default period of time may vary based on the group to which each client device is assigned. For example, each different group may be assigned a different default period of time to remain in an RSC mode.

At 614, the process 600 may involve storing the grouping information and corresponding time periods in a database of the network management system. The grouping information may then be used by the network management system when making a determination about the group of client devices to be switched to RSC mode when the status of the network declines.

Figure 7:
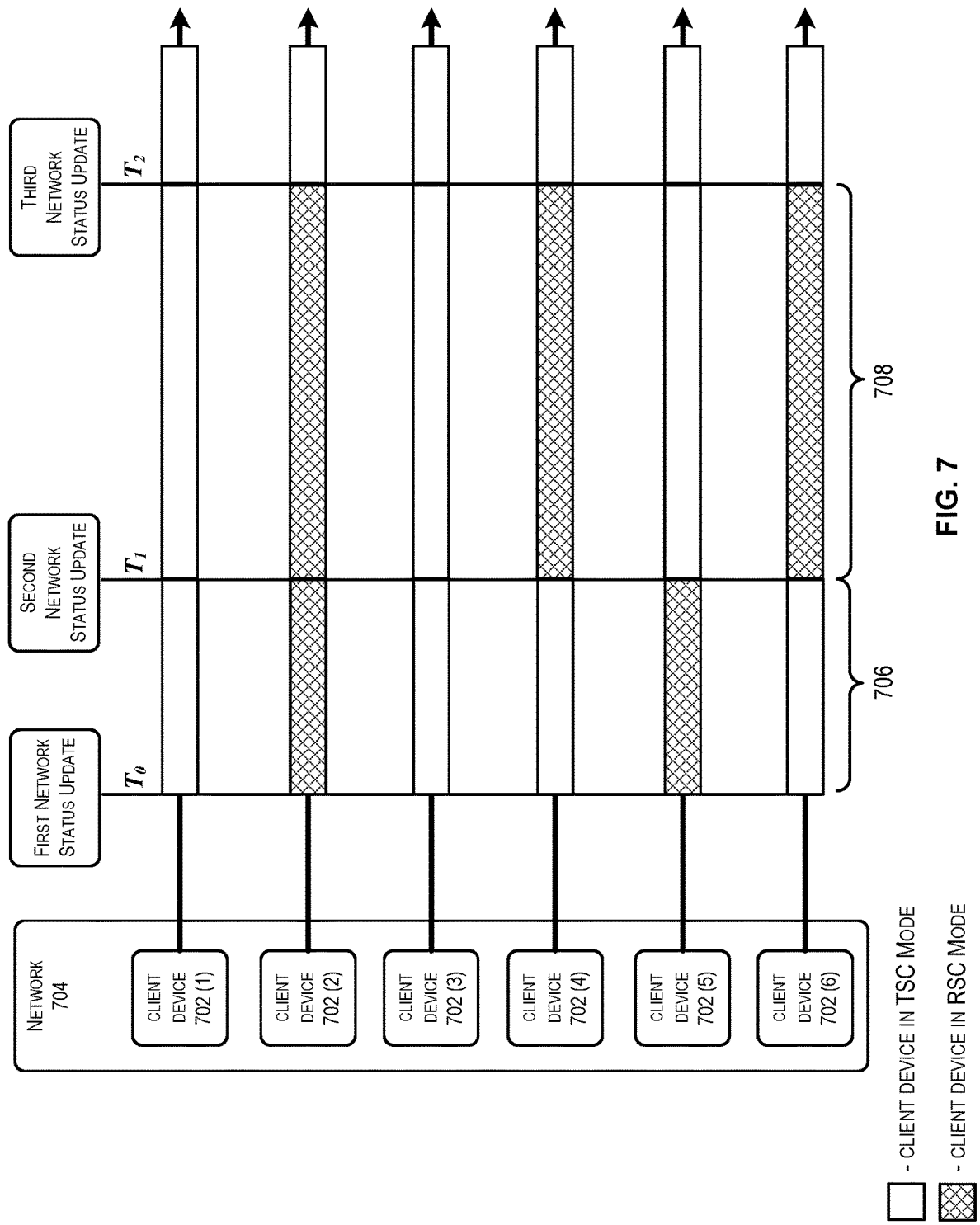
FIG. 7 depicts an example of compensation mode switching as performed within a network of client devices over time in accordance with at least some embodiments.

FIG. 7 depicts an example of compensation mode switching as performed within a network of client devices over time in accordance with at least some embodiments. Particularly, FIG. 7 depicts a number of client devices 702 (1-6) in communication with a network 704 that may be switched between compensation modes. At an initial time, each of the client devices in the network 704 may be placed in a TSC mode.

As depicted in FIG. 7, each of the client devices 702 (1-6) may be configured to operate in one of two compensation modes. At a first time T₀, a first network status update may be performed by the network management system. Upon performing the first network status update, a determination may be made that a current status of the network 704 is substandard. Upon making that determination, the network management system may select a first subset of the client devices 702 (e.g., 2 and 5) to be placed in an RSC mode. Upon making the determination, the network management system may determine a first period of time 706 over which the first subset of client devices is to be in RSC mode.

At a second time T₁ after the expiration of the time period 706, a second network status update may be performed by the network management system. Upon performing the second network status update, a determination may be made that the current status of the network 704 has declined. Upon making that determination, the network management system may select a second subset of the client devices 702 (e.g., 2, 4, and 6) to be placed in an RSC mode. Upon making the determination, the network management system may determine a second period of time 708 over which the second subset of client devices is to be in RSC mode.

At a third time $T_2$ after the expiration of the time period 708, a second network status update may be performed by the network management system. Upon performing the second network status update, a determination may be made that the current status of the network 704 has improved (e.g., a network score is above a threshold value). Upon making that determination, the network management system may restore each of the client devices 702 to a TSC mode. Upon making the determination, the network management system may schedule a time at which the next network status update is performed.

Figure 8:
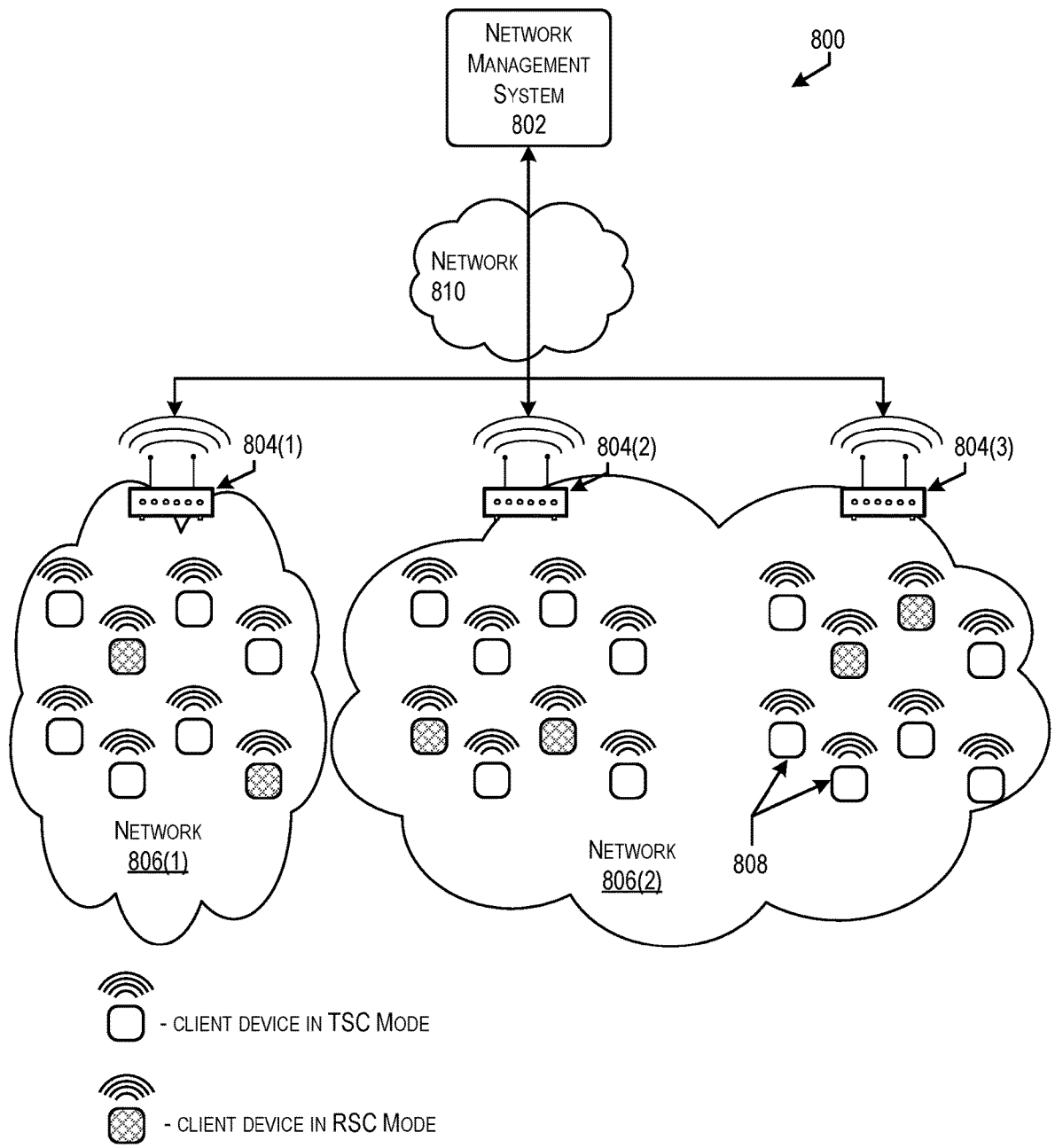
FIG. 8 depicts an example environment in which a network management system may perform mode selection across a number of networks/client devices in accordance with at least some embodiments.

FIG. 8 depicts an example environment in which a network management system may perform mode selection across a number of networks/client devices in accordance with at least some embodiments. In the environment 800, a network management system 802 is in communication with a number of gateway devices 804 (1-3). Each of the gateway devices 804 may act as an egress/ingress point for a network 806 that includes a number of client devices 808.

In some embodiments, each gateway device 804 (1-3) may act as an access point for a different network 806 (1-2). In some embodiments, multiple of the gateway devices 804 (1-3) may access a single network 806. For example, gateway devices 804 (2) and 804 (3) are each depicted as providing access to the network 806 (2). In embodiments, the network management system 802 may communicate with the gateway devices 804 via a network 810. The network 810 may be any suitable communication network, such as the Internet.

In the environment 800, the network management system 802 may be configured to cause client devices in each of the networks 806 (1-2) to be placed in a selected mode. Each of the networks 806 may have different bandwidth capabilities. In embodiments, a current status may be determined for each of the networks 806 with respect to the characteristics of that network. The number of client devices 808 placed into a selected mode in each network may vary based on a respective status of that network. Based on the respective current status for each of networks 806, the network management system 802 may be configured to determine a number of client devices 808 in the respective network to be switched to RSC mode.

Figure 9:
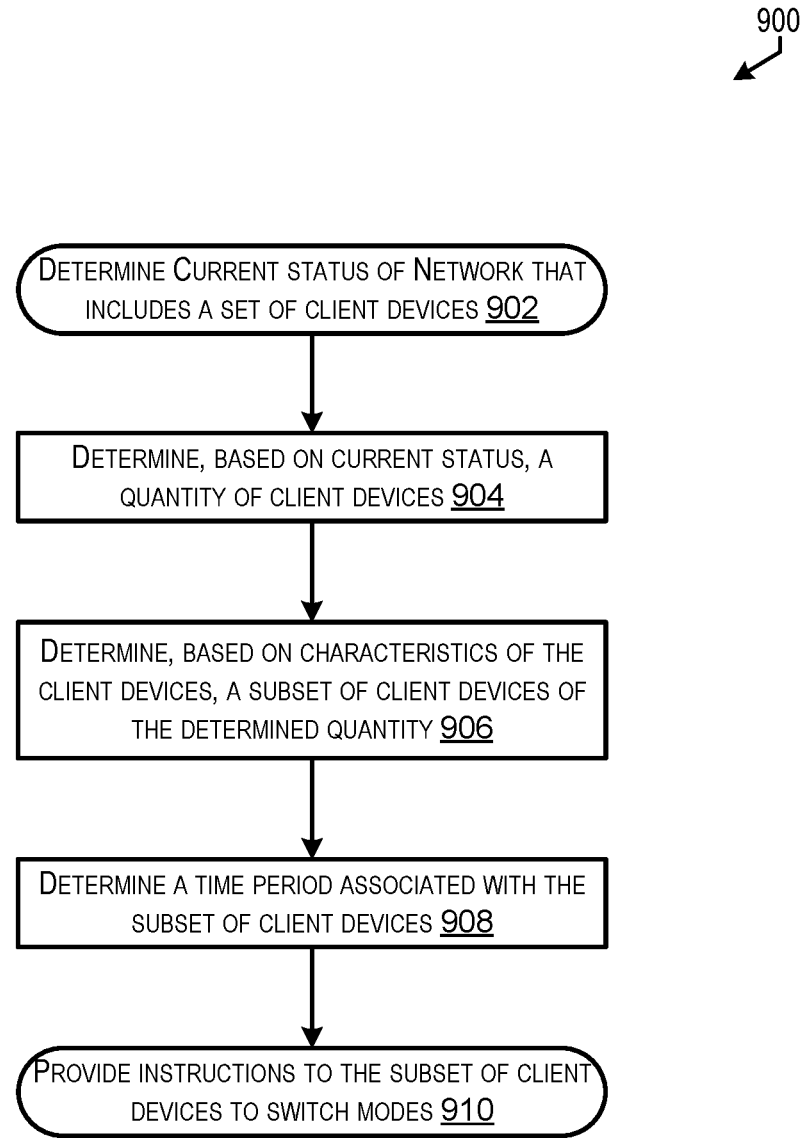
FIG. 9 depicts a flow diagram illustrating a process for managing compensation modes across a number of client devices in accordance with at least some embodiments.

FIG. 9 depicts a flow diagram illustrating a process for managing compensation modes across a number of client devices in accordance with at least some embodiments. While the process 900 is depicted as a series of blocks, it should be noted that the steps described in relation to process 900 may be performed in any suitable order. The process 900 may be performed by a network management system, such as the network management system 108 as described in relation to FIG. 1 above. As described elsewhere, the network management system may be in communication with a number of client devices in a network via a gateway device.

At 902, the process 900 may involve determining a current status of a network that includes a set of client devices. The network may be a low power wireless area network (LPWAN) and the client device may be a wireless sensor device. In some embodiments, determining the current status of the network involves obtaining metrics about the network and calculating a network score based on the metrics. For example, such metrics about the network may include a latency, a jitter, or loss associated with the network.

In accordance with one or more preferred implementations, a gateway device maintains a count of packets transmitted (e.g., packets transmitted to a first client device) and receives feedback messages from the client devices indicating received packets (e.g., receives from the first client device an indication of received packets or a total number of packets received). In accordance with one or more preferred implementations, a gateway device determines a throughput metric for a downlink channel based on the total number of packets transmitted and the total number of packets received.

In accordance with one or more preferred implementations, a gateway device may similarly receive information from one or more client devices regarding a total number of packets sent to the gateway device and may be able to utilize such information together with information regarding packets received to similarly determine a throughput metric for an uplink channel.

At 904, the process 900 may involve determining based on a determined current status of the network, a quantity of the set of client devices to be switched from a first mode to a second mode. In embodiments, the first timing compensation mode is a transmit side compensation (TSC) mode and the second timing compensation mode is a receive side compensation (RSC) mode. In embodiments, the quantity (i.e., number) of client devices in the network to be switched may be determined based on a comparison of the current network status to an expected or optimal network status. For example, in cases in which a network score is generated from the metrics obtained for a network, the network score may be compared to a threshold network score value to determine if the current status of the network is acceptable. In these cases, the quantity may be determined as a function of the relationship between the network score and the threshold value.

At 906, the process 900 may involve determining, based on characteristics of the client devices included in the network, a subset of the client devices of the determined quantity. In some embodiments, the characteristics used to determine the subset of client devices may include information about a clock drift associated with the individual client devices. In some of these embodiments, information about the clock drift for each client device is provided by a manufacturer of that client device (e.g., prior to performance of the process 900). In some of these embodiments, the information about the clock drift for a client device is determined based on a synchronization signal received from that client device.

In some embodiments, the characteristics used to determine the subset of client devices may include information about a battery of at least one client device of the set of client devices. In some of these embodiments, the information about the battery is determined based on information received from a battery sensor in the respective client devices. Suitable battery information that may be used may include at least one of a state of charge (SOC), state of function (SOF), a state of health (SOF), or a temperature associated with a battery of the at least one client device.

At 908, the process 900 may involve determining a time period associated with the subset of the client devices. In some embodiments, the time period may be a default time period. In some embodiments, the time period may be determined based on one or more characteristics of the client devices in the subset of client devices. For example, the time period may be determined based on a current SOC of a battery of at least one of the client devices in the subset.

At 910, the process 900 may involve providing instructions to the subset of the client devices to switch to the second mode. In some embodiments, this involves the network management system providing instructions to the gateway device, and the gateway device instructing individual client devices in the subset of client devices to be switched from the first mode to the second mode.

In some embodiments, upon expiration of the time period, the method may further involve providing, to individual client devices in the subset of the set of client devices, instructions to cause the individual client devices to switch from the second mode (e.g., RSC mode) back to the first mode (e.g., TSC mode). Furthermore, the network management system may be configured to cycle different groups of client devices into, and out of, different timing compensation modes. For example, the network management system may be configured to upon expiration of the time period, determine a second subset of the set of client devices, and provide, to the individual client devices in the second subset of the set of client devices, instructions to cause the individual client devices to switch from the first mode to the second mode.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising:
    storing, by a first electronic device, first data indicating that
        a first set of node devices are associated with a first mode, and
        a second set of node devices are associated with a second mode;
    determining, based on the first data, a first number of preamble symbols for a packet preamble for communication with a first node of the first set of node devices;
    sending, by the first electronic device to the first node device of the first set of node devices, a first packet comprising a packet preamble having the first number of preamble symbols;
    determining, based on the first data, a second number of preamble symbols for a packet preamble for communication with a second node of the second set of node devices, the second number of preamble symbols being greater than the first number of preamble symbols;
    sending, by the first electronic device to the second node device of the second set of node devices, a second packet comprising a packet preamble having the second number of preamble symbols;
    storing, by the first electronic device, second data indicating that
        the first set of node devices are associated with the second mode, and
        the second set of node devices are associated with the first mode;
    determining, based on the second data, a third number of preamble symbols for a packet preamble for communication with a first node of the first set of node devices; and
    sending, by the first electronic device to the second node device, third data indicating to transition from the second mode to the first mode.

2. The method of claim 1, wherein the method comprises:
    determining first clock drift data for the first node device; and
    determining to include the first node device in the first set of node devices based on the first clock drift data for the first node device.

3. The method of claim 1, wherein the method comprises:
    determining, based on battery level data for a plurality of node devices, one or more node devices to include in the second set of node devices.

4. A method comprising:
    storing, by a first electronic device, first data associating a first client device with a first mode;
    sending, by the first electronic device to the first client device, a first packet comprising a packet preamble having a first length, the first length being determined based on the first data;
    sending, by the first electronic device to a second client device, a second packet comprising a packet preamble having a second length, the second length being greater than the first length;
    determining that a first period of time has elapsed;
    based on the determining that the first period of time has elapsed,
        storing, by the first electronic device, second data associating the second client device with the first mode, and
        sending, by the first electronic device to the second client device, third data indicating to increase a receive window duration.

5. The method of claim 4, wherein the method comprises sending, by the first electronic device to the first client device, fourth data indicating to decrease a receive window duration.

6. The method of claim 4, wherein the method comprises, after sending the third data:
    sending, by the first electronic device to the first client device, a third packet comprising a packet preamble having the second length; and
    sending, by the first electronic device to the second client device, a fourth packet comprising a packet preamble having the first length.

7. The method of claim 4, wherein the method comprises determining to use the second length for a packet preamble for communication with the second client based on determining that the second client is not part of a first set of client devices associated with the first mode.

8. The method of claim 4, wherein the method comprises:
    storing, by the first electronic device, fourth data associating a first set of client devices with the first mode;
    storing, by the first electronic device, fifth data associating a second set of client devices with a second mode, the second set of client devices including the second client device; and
    determining to use the second length for a packet preamble for communication with the second client device based on determining that the second client device is part of the second set.

9. The method of claim 4, wherein the method comprises receiving, from a remote computing system, fourth data associating a first set of client devices with the first mode, and wherein the storing of the first data is based on the fourth data.

10. The method of claim 4, wherein the method comprises
sending, to a remote computing system, network information; and
receiving, from the remote computing system, fourth data associating a second set of client devices with the first mode;
wherein the storing of the second data is based on the fourth data.

11. The method of claim 4, wherein the method comprises:
receiving, from the first client device, a first feedback message;
receiving, from the second client device, a second feedback message;
determining a number of packets sent;
determining, based on the first feedback message, the second feedback message, and the number of packets sent, network information; and
sending the network information to a remote computing system.

12. The method of claim 4, wherein the method comprises:
determining first clock drift data for the first client device; and
determining to include the first client device in a first set of client devices based on the first clock drift data for the first client device;
wherein the storing of the first data associating the first client device with the first mode is based on the determining to include the first client device in the first set of client devices.

13. The method of claim 12, wherein the method comprises:
determining second clock drift data for the second client device; and
determining to include the second client device in a second set of client devices based on the second clock drift data for the second client device;
wherein the sending of the third data indicating to increase a receive window duration is based on the determining to include the second client device in the second set of client devices.

14. The method of claim 4, wherein the method comprises:
determining first clock drift data for a first set of client devices and a second set of client devices, the first set of client devices including the first client device and the second set of client devices including the second client device;
determining, based on the first clock drift data, the first period of time, the first period of time being a period of time to operate the first set of client devices in the first mode; and
determining, based on the first clock drift data, a second period of time to operate the second set of client devices in the first mode, the second period of time being shorter than the first period of time.

15. The method of claim 4, wherein the method comprises:
receiving battery level data associated with the first client device; and
determining, based on the battery level data, the first period of time.

16. The method of claim 4, wherein the method comprises:
determining, based on battery level data for a plurality of client devices, one or more client devices to include in a set of client devices.

17. The method of claim 4, wherein the method comprises:
sending, to a remote computing system, battery level data for a plurality of client devices; and
receiving, from the remote computing system, fourth data indicating one or more client devices to include in a set of client devices, the storing of the second data being based on the fourth data.

18. The method of claim 4, wherein the method comprises:
determining, based on battery level data and location data for a plurality of client devices, one or more client devices to include in a set of client devices.

19. The method of claim 4, wherein the method comprises:
determining first clock drift data for the first client device; and
determining to include the first client device in a first set of client devices based on the first clock drift data for the first client device;
wherein the first clock drift data comprises a parts per million (PPM) offset related to a crystal oscillator at room temperature.

20. An electronic device comprising:
one or more processors; and
one or more non-transitory computer-readable media storing computer-executable instructions that, when executed by the one or more processors, cause the electronic device to perform operations comprising:
storing, by the electronic device, first data associating a first set of client devices with a first mode,
sending, by the electronic device to a first client device of the first set of client devices, a first packet comprising a packet preamble having a first length, the first length being determined based on the first data;
sending, by the electronic device to a second client device, a second packet comprising a packet preamble having a second length, the second length being greater than the first length;
storing, by the electronic device, second data associating a second set of client devices with the first mode, the second set of client devices including the second client device; and
sending, by the electronic device to the second client device, third data indicating to transition from the second mode to the first mode.

21. The electronic device of claim 20, wherein the one or more non-transitory computer-readable media store computer-executable instructions that, when executed by the one or more processors, cause the electronic device to perform operations comprising sending, by the first electronic device to the first client device, fourth data indicating to transition from the first mode to the second mode.

22. The electronic device of claim 20, wherein the one or more non-transitory computer-readable media store computer-executable instructions that, when executed by the one or more processors, cause the electronic device to perform operations comprising:
sending, by the first electronic device to the first client device of the first set of client devices, a third packet comprising a packet preamble having the second length; and sending, by the first electronic device to the second client device of the second set of client devices, a fourth packet comprising a packet preamble having the first length.

23. The electronic device of claim 20, wherein the one or more non-transitory computer-readable media store computer-executable instructions that, when executed by the one or more processors, cause the electronic device to perform operations comprising determining to use the second length for a packet preamble for communication with the second client based on determining that the second client is not part of the first set.

24. The electronic device of claim 20, wherein the one or more non-transitory computer-readable media store computer-executable instructions that, when executed by the one or more processors, cause the electronic device to perform operations comprising:
storing, by the first electronic device, third data associating a second set of client devices with a second mode, the second set of client devices including the second client device; and
determining to use the second length for a packet preamble for communication with the second client based on determining that the second client is part of a second set.

25. The electronic device of claim 20, wherein the one or more non-transitory computer-readable media store computer-executable instructions that, when executed by the one or more processors, cause the electronic device to perform operations comprising receiving, from a remote computing system, third data associating the first set of client devices with the first mode, and wherein the storing of the first data is based on the third data.

26. The electronic device of claim 20, wherein the one or more non-transitory computer-readable media store computer-executable instructions that, when executed by the one or more processors, cause the electronic device to perform operations comprising:
sending, to a remote computing system, network information; and
receiving, from the remote computing system, third data associating the second set of client devices with the first mode;
wherein the storing of the second data is based on the third data.

27. The electronic device of claim 20, wherein the one or more non-transitory computer-readable media store computer-executable instructions that, when executed by the one or more processors, cause the electronic device to perform operations comprising:
determining first clock drift data for the first client device; and
determining to include the first client device in the first set of client devices based on the first clock drift data for the first client device;
determining second clock drift data for the second client device; and
determining to include the second client device in a second set of client devices based on the second clock drift data for the second client device.

28. The electronic device of claim 20, wherein the one or more non-transitory computer-readable media store computer-executable instructions that, when executed by the one or more processors, cause the electronic device to perform operations comprising:
determining first clock drift data for the first set of client devices and the second set of client devices;
determining, based on the first clock drift data, a first period of time to operate the first set of client devices in the first mode; and
determining, based on the first clock drift data, a second period of time to operate the second set of client devices in the first mode, the second period of time being shorter than the first period of time.

29. The electronic device of claim 20, wherein the one or more non-transitory computer-readable media store computer-executable instructions that, when executed by the one or more processors, cause the electronic device to perform operations comprising:
receiving battery level data associated with the first client;
determining, based on the battery level data, a first period of time;
determining that the first period of time has elapsed; and
wherein the sending of the third data is based on the determining that the first period of time has elapsed.

30. The electronic device of claim 20, wherein the one or more non-transitory computer-readable media store computer-executable instructions that, when executed by the one or more processors, cause the electronic device to perform operations comprising:
determining, based on battery level data for a plurality of client devices, one or more client devices to include in the second set of client devices.

31. The electronic device of claim 20, wherein the one or more non-transitory computer-readable media store computer-executable instructions that, when executed by the one or more processors, cause the electronic device to perform operations comprising:
sending, to a remote computing system, battery level data for a plurality of client devices; and
receiving, from the remote computing system, fourth data indicating one or more client devices to include in the second set of client devices, the storing of the second data being based on the fourth data.

32. A method comprising:
receiving, from a first electronic device, network information indicating a plurality of client devices;
determining, based on first information for each of the plurality of client devices,
a first set of client devices comprising one or more of the pluralities of client devices, and
a second set of client devices comprising one or more of the pluralities of client devices;
determining a first period of time to operate the first set of client devices in a first mode, the first mode being associated with use of an increased receive window duration;
determining a second period of time to operate the second set of client devices in the first mode, the second period of time being different than the first period of time;
sending, to the first electronic device,
first data indicating the first set of client devices is associated with the first period of time, and
second data indicating the second set of client devices is associated with the second period of time.

33. The method of claim 32, wherein the first information for each of the plurality of client devices comprises clock drift information for each of the plurality of client devices.

34. The method of claim 33, wherein clock drift information for each client device of the first set of client devices indicates a clock drift value below a first number, and wherein clock drift information for each client device of the first set of client devices indicates a clock drift value above a second number, the second number being equal to or higher than the first number, and wherein the second period of time is shorter than the first period of time.

35. The method of claim 33, wherein the method comprises sending, to the first electronic device, third data indicating the first period of time and fourth data indicating the second period of time.

36. The method of claim 33, wherein the first clock drift data comprises a parts per million (PPM) offset related to a crystal oscillator at room temperature.

37. The method of claim 32, wherein the first information for each of the plurality of client devices comprises battery level information for each of the plurality of client devices, and wherein the method comprises receiving, from the first electronic device, the battery level information for one or more of the pluralities of client devices.

* * * * *